(12) United States Patent
Ohtsuka et al.

(10) Patent No.: US 6,767,120 B2
(45) Date of Patent: Jul. 27, 2004

(54) VEHICLE LAMP

(75) Inventors: Yasushi Ohtsuka, Shimizu (JP); Haruhiko Iyoda, Shimizu (JP)

(73) Assignee: Koito Manufacturing Co., Ltd., Tokyo (JP)

(*) Notice: Subject to any disclaimer, the term of this patent is extended or adjusted under 35 U.S.C. 154(b) by 69 days.

(21) Appl. No.: 10/286,487

(22) Filed: Nov. 1, 2002

(65) Prior Publication Data

US 2003/0086276 A1 May 8, 2003

(30) Foreign Application Priority Data

Nov. 2, 2001 (JP) .................................. 2001-337543

(51) Int. Cl.$^7$ ................................................. F21V 9/00
(52) U.S. Cl. .................... 362/511; 362/545; 362/555; 362/31; 362/26; 362/800; 340/815.42; 340/815.45; 340/815.43
(58) Field of Search ................................. 362/511, 545, 362/555, 31, 26, 800; 340/815.42, 815.43

(56) References Cited

U.S. PATENT DOCUMENTS 6,520,666 B1 * 2/2003 Beyerlein et al. ........... 362/471
6,663,273 B2 * 12/2003 Robey ......................... 362/559

FOREIGN PATENT DOCUMENTS

| DE | 41 29 094 | | 3/1993 | |
|---|---|---|---|---|
| GB | 2 348 824 B | | 3/2001 | |
| JP | 1-92004 | | 6/1989 | |
| JP | 2601633 | | 10/1999 | |
| JP | 2003068115 | * | 8/2001 | ............. F21S/8/10 |

* cited by examiner

Primary Examiner—Sandra O'Shea
Assistant Examiner—Bertrand Zeade
(74) Attorney, Agent, or Firm—Koda & Androlia

(57) ABSTRACT

A vehicle lamp that includes a light-emitting diode group formed by light-emitting diodes, which are disposed in a row with the irradiation direction directed toward the front of the lamp, and a light guiding plate, which is a transparent plate and is provided in front of the light-emitting diode group so as to be in the front-back direction of the lamp; and a plurality of light guiding plate units are provided inside a lamp chamber so that the light guiding plate units are spacedly disposed one on the other, each of the light guiding plate units causing the light from the light-emitting diodes to enter the light guiding plate from the rear end surface of the light guiding plate and further causing the light to exit from the front end surface of the light guiding plate toward the front of the lamp.

16 Claims, 3 Drawing Sheets

VEHICLE LAMP

BACKGROUND OF THE INVENTION

1. Field of the Invention

The present invention relates to a vehicle lamp and more particularly to a vehicle lamp that provides a good depth appearance and draws attention of the drivers of the following vehicles particularly when it is on.

2. Prior Art

Conventional marker lamps for vehicles such as automobiles use electric bulbs (bulbs), for instance, incandescent lamp bulbs, as the light source. Recently, however, light-emitting diodes are employed on an increasing number of occasions so as to meet the requirements for various reasons that includes better designs and reduced power consumption.

Some vehicle lamps that employ the light-emitting diodes incorporate a platy shape transparent light guiding plate.

More specifically, in such a lamp that employs light-emitting diodes and a light guiding plate, the light from the light-emitting diodes that are disposed so as to face one or two end surfaces of the light guiding plate enters the light guiding plate, and the light entering the light guiding plate is reflected by the back surface of the light guiding plate and is thereby caused to exit from the front surface of the light guiding plate. In other words, the light guiding plate is used as a so-called "surface light source".

However, the conventional vehicle lamp that uses a light guiding plate as a surface light source has a flat luminescent image; as a result, its three-dimensional appearance is poor, and the impact on viewers is weak regardless of when the lamp is on or off.

SUMMARY OF THE INVENTION

Accordingly, the object of the present invention to provide a vehicle lamp that produces a good depth appearance for a vehicle lamp during both the non-lighting state and the lighting state and produces a great change in appearance between the non-lighting state and the lighting state, thus drawing a great deal of attention of the drivers of the following vehicles and the like.

The above object is accomplished by a unique structure for a vehicle lamp that includes:

a light-emitting diode group formed by a plurality of light-emitting diodes disposed in a row so that an irradiation direction of the diodes is directed toward the front region of the lamp, and a light guiding plate which is a transparent plate and is provided in front of the light-emitting diode group so as to be parallel to the front-back direction of the lamp; wherein a plurality of light guiding plate units are provided inside a lamp chamber, which is defined by a lamp body and a translucent front cover that covers the front face of the lamp body, so that the light guiding plate units are disposed in the direction perpendicular to the front-back direction of the lamp (so as to be spacedly one on the other), each of the light guiding plate units causing the light from the light-emitting diodes to enter the light guiding plate from the rear end surface of the light guiding plate toward the front end portion of the light guiding plate and further causing at least substantially the entire light from the light-emitting diodes to exit from the front end surface of the light guiding plate toward the front of the lamp.

In the vehicle lamp of the present invention, the light guiding plate is disposed in parallel to the front-back direction of the lamp. Accordingly, the light-emitting diodes are disposed as a light source behind the light guiding plate. Thus, when the lamp is not turned on, the lamp produces a good depth appearance, the light-emitting diodes are substantially inconspicuous, and the color of the light guiding plate (transparent) makes a dominant color as a whole. On the other hand, when the lamp is on, the lamp produces functional color light such as red, orange, etc. in accordance with the functions of the lamp, thus providing a great change from the non-lighted-up state. The lamp draws great attention of the drivers of the vehicles behind and thus contributes to the traffic safety.

DETAILED DESCRIPTION OF THE INVENTION

Figure 1:
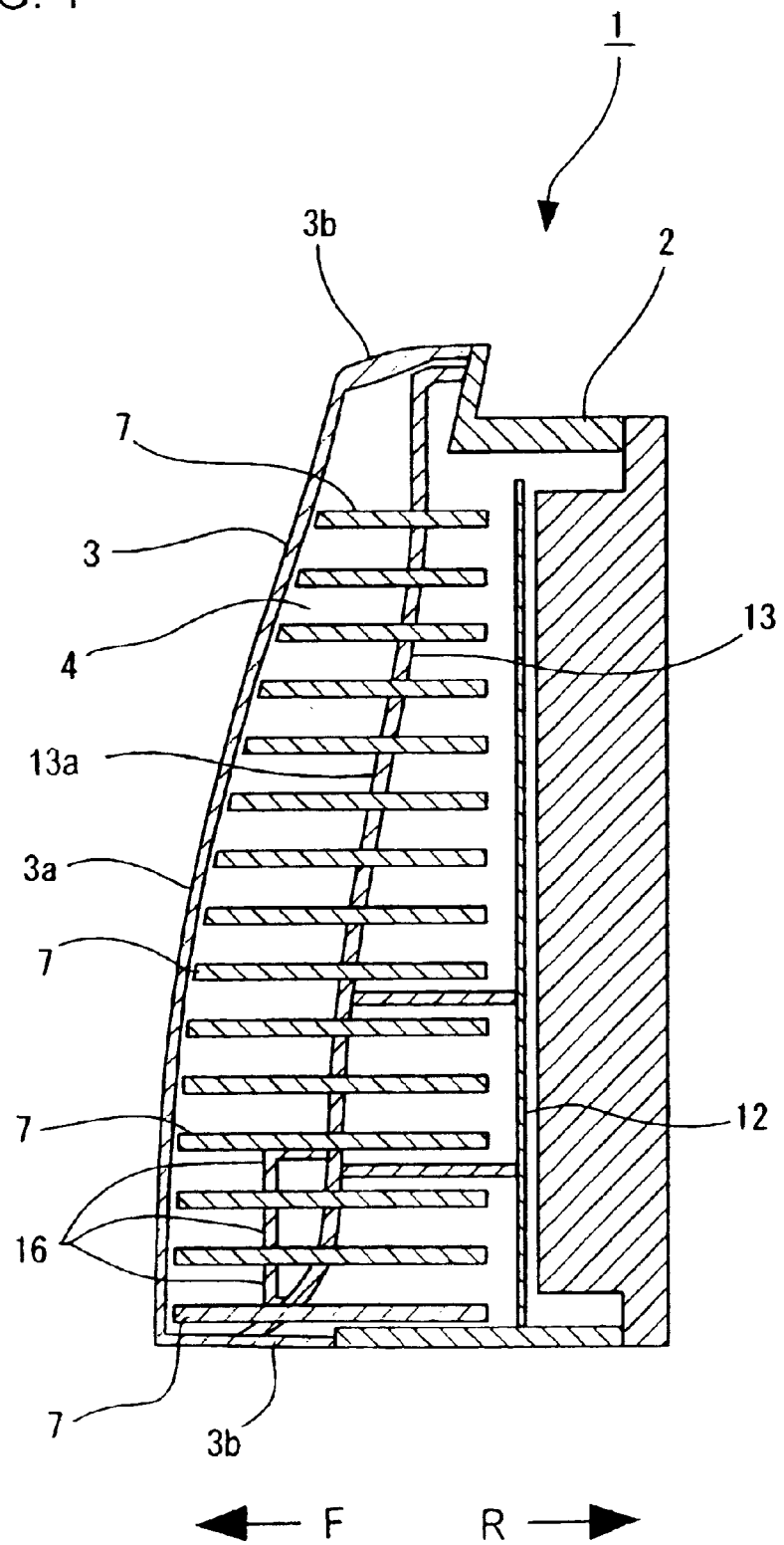
FIG. 1 illustrates in vertical cross section an embodiment of the vehicle lamp according to the present invention.

Embodiment of a vehicle lamp according to the present invention will be described with reference to the accompanying drawings. In the following embodiments, the present invention is described on a rear marker lamp for a vehicle.

The vehicle marker lamp 1 includes a lamp body 2 that has a recess portion that opens forward. A lamp chamber 4 is formed by the lamp body 2 and a transparent front cover 3 that covers the front opening of the lamp body 2. The front cover 3 has a front face portion 3a that substantially covers the forward portion of the lamp body 2 and a side face portion 3b that protrudes rearward from the peripheral edge of the front face portion 3a. The front face portion 3a and the side face portion 3b are integrally formed. The front cover 3 is a colorless transparent cover and has no lens element. Thus, it is a generally-termed "plain transparent cover". However, the front cover 3 can have a lens element such as a diffusing step or the like. Furthermore, instead of a colorless transparent type, the front cover 3 can be a colored transparent cover, for example, a generally-termed smoke lens that has a light black color.

A plurality of light guiding plate units 5 are disposed inside the lamp chamber. Each of the light guiding plate units 5 is formed by a light guiding plate 7 and a plurality of light-emitting diodes that are disposed in a row as best seen from FIG. 3 and form a light-emitting diode group 6. Each light guiding plate 7 is transparent and has a platy shape formed from a transparent synthetic resin or the like.

The light guiding plates 7 are disposed so as to extend parallel to the front-back direction (or parallel to the direction of the depth) of the lamp (see FIG. 1), that is, parallel to the direction shown by an arrow F-R in FIG. 1 (F represents the forward direction, and represent the rearward direction). In other words, the direction of the plane of each light guiding plate 7 is in the front-back direction of the lamp.

In each light guiding plate 7, the front end surface 7a makes an exit surface, and the rear end surface 7b makes an incidence surface.

The rear end surface 7b has a plurality of semi-circular recesses that are arranged in the direction of the width of the light guiding plate 7. The inner surfaces of the recesses serve as step surfaces 8. Portions on the sides of portions having the step surfaces 8 of each light guiding plate 7 have inclined surfaces 9 that form an angle of about 45° with respect to the rear end surface 7b of the light guiding plate 7. Portions having the continuous inclined surfaces 9 have V-shaped recesses.

The exit surface 7a has fine projections and depressions (not shown) that are densely formed.

Light-emitting diodes 10 arranged in a row are disposed so that the light-emitting portion 10a of each light-emitting diode 10 faces the corresponding one of the step surfaces 8, thus forming the light guiding plate unit 5.

In each of the light guiding plate unit 5, the light from the light-emitting diodes 10 enters the light guiding plate 7 from the step surfaces 8.

When the light enters the light guiding plate 7, the light is refracted in accordance with the angle of incidence with respect to the step surfaces 8. Since the step surfaces 8 have a generally semi-circular shape, the light entering the light guiding plate 7 diffuses into the entire light guiding plate 7 in an almost fan-shaped pattern.

The light advances throughout the light guiding plate 7 and reaches the front end while repeating internal reflection and goes out from the front end surface, that is, the exit surface 7a, in the forward direction of the lamp.

The light entering the light guiding plate 7 from the step surfaces 8 and advancing toward the inclined faces 9 is internally reflected in the inclined faces 9 and goes to substantially the front end face 7a of the light guiding plate 7.

Figure 3:
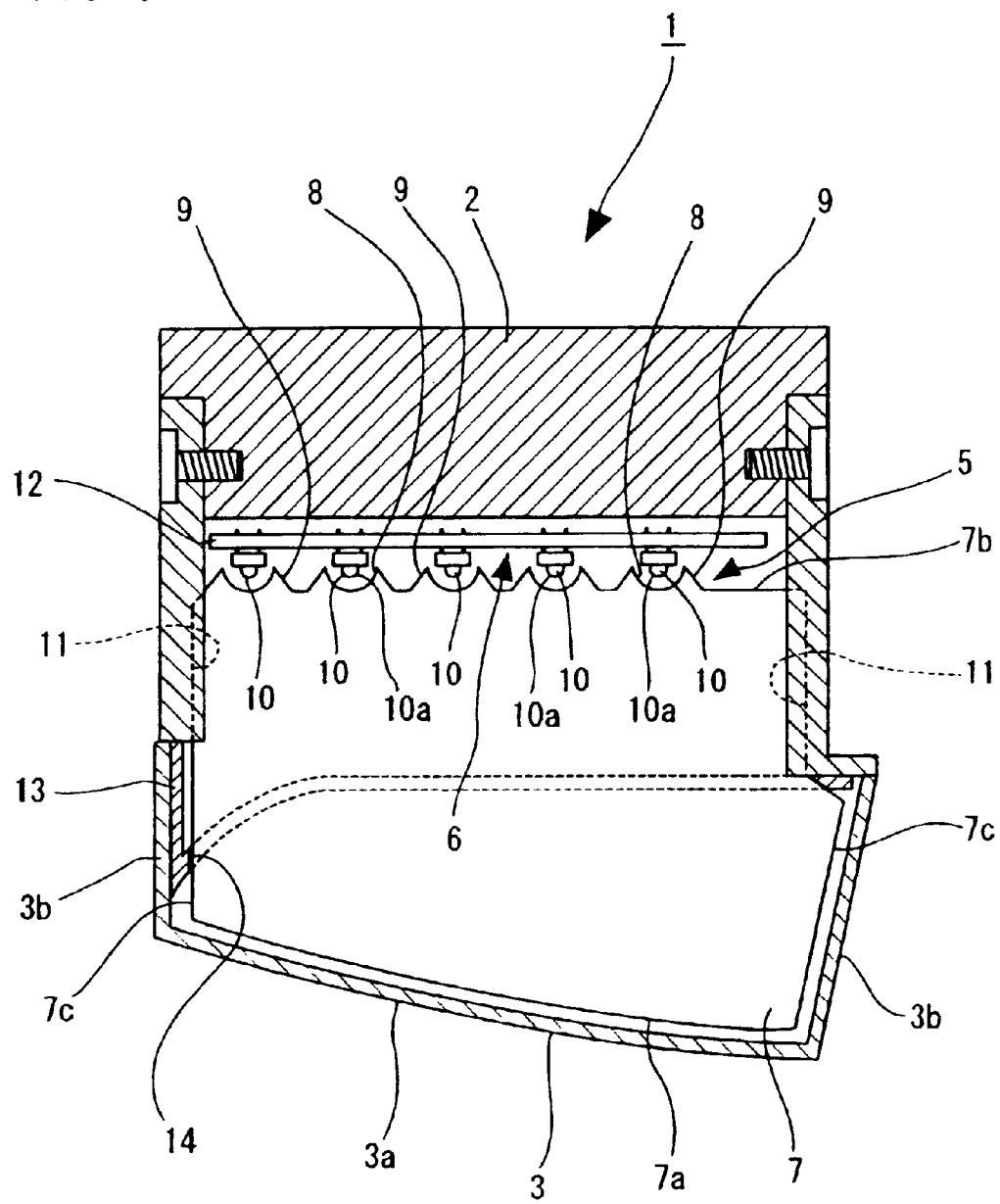
FIG. 3 is an enlarged sectional view taken along line 3—3 in FIG. 2.

Though each step surface 8 has a generally semi-circular shape as seen from FIG. 3 in the above embodiment, the step surfaces 8 can take various shapes in accordance with purposes. For example, instead of the semicircular surface, a surface having fine stripe-fashion projections and depressions, that is, a Fresnel surface, can be adopted. Furthermore, the angle can be selected such that incident light is greatly refracted toward the side surface 7c of the light guiding plate 7. For example, if a step surface is formed so that a portion of incident light has an angle of incidence with respect to the side surface 7c that is equal to or less than a critical angle, a portion of the light can be caused to exit from the side surface 7c, so that sideway irradiation can be achieved as well as forward irradiation.

A plurality of light guiding plate units 5 are disposed inside the lamp chamber 4. More specifically, the light guiding plate units 5 are disposed so that the direction of the plane of the light guiding plate 7 of each unit is parallel to the front-back direction of the lamp 1.

In the shown embodiment, the light-emitting diodes 10 of each light-emitting diode group 6 are arranged in the horizontal direction.

Figure 2:
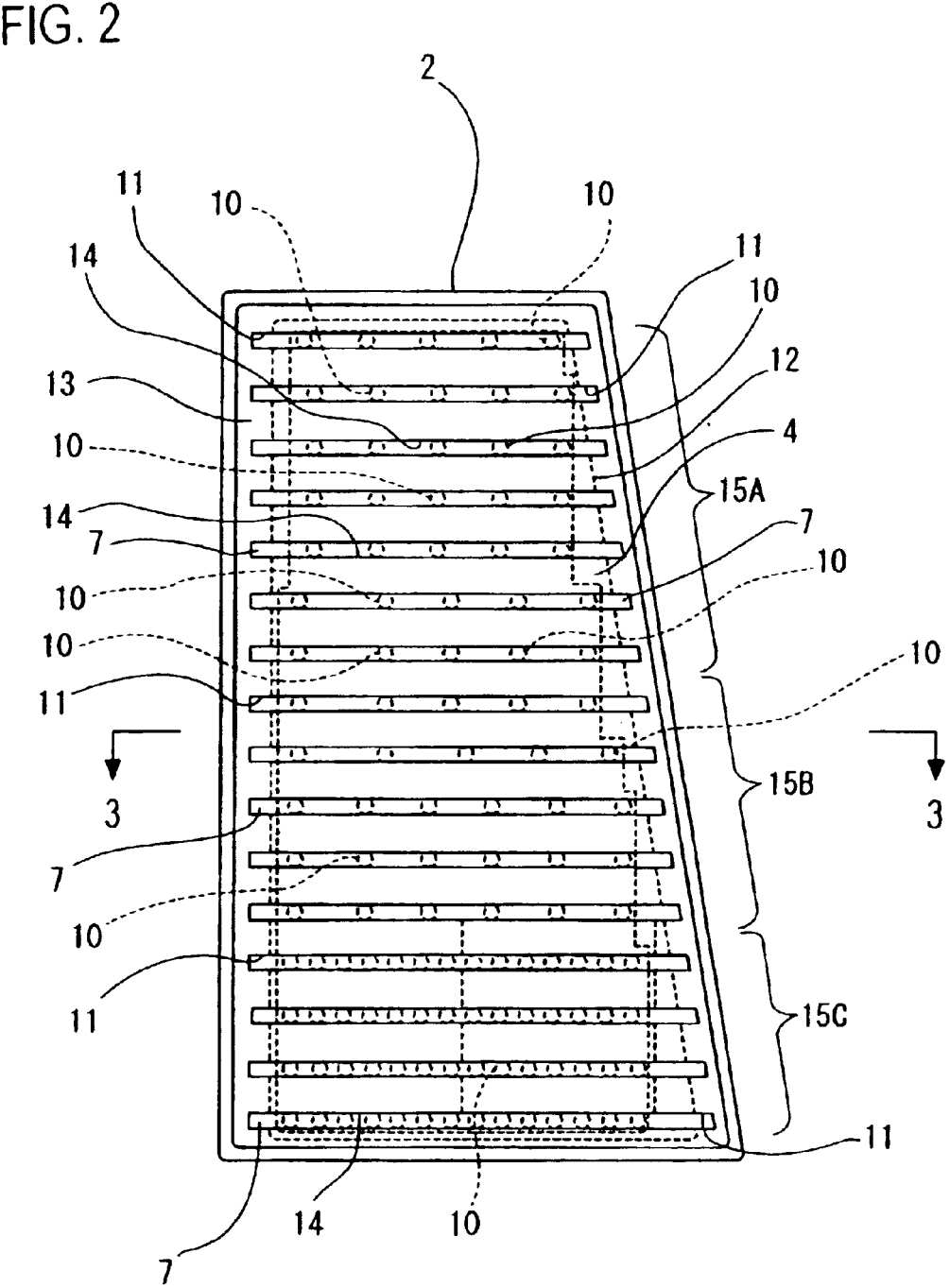
FIG. 2 is a front view of the vehicle lamp with a front cover removed.

A plurality of left and right side insert grooves 11 are, as best seen from FIG. 2, formed in a vertical direction in the internal surfaces of the left and right side portions of the lamp body 2.

The light guiding plates 7 are installed in the lamp body 2 by, as best seen from FIG. 3, inserting substantially the rear half of the left and right side edges of each light guiding plate 7 into the corresponding insert grooves 11.

Inside the lamp body 2, an LED circuit board 12 is disposed at a position that corresponds to the position immediately behind the rear end portions of the insert grooves 11. The front surface of the LED circuit board 12 is provided with a plurality of light-emitting diodes 10. Thus, a plural number of light-emitting diode groups 6 are arranged in a vertical direction. The light-emitting portions 10a of the light-emitting diodes 10 are positioned so as to face the step surfaces 8 of the light guiding plates 7.

A non-translucent platy member 13, that is, an element called a "decorative member" in the present specification, is disposed substantially at the opening face of the lamp body 2 so as to cover the front area of the lamp body 2.

The front surface 13a (See FIG. 1) of the decorative member 13 is provided with a metal-deposited film, thus forming a reflecting surface. However, the front surface of the decorative member 13 is not necessarily a reflecting surface, and it can be any surface that allows no light to pass through it. Depending on design requirements, the decorative member 13 may have colors.

The decorative member 13 is provided with insert holes 14 that extend in the lateral (horizontal) direction (see FIG. 2) and are juxtaposed in a vertical direction. Upon installation, the light guiding plates 7 are inserted into the insert holes 14 of the decorative member 13 first, and then the side portions of the light guiding plates 7 are inserted into the insert grooves 11 of the lamp body 2.

The light guiding plate units 5 are grouped into three luminescent blocks 15A, 15B and 15C; and the light-emitting diodes 10 that belong to each one of the luminescent blocks 15A, 15B and 15C have different luminescent colors from those of another block.

In other words, the light-emitting diodes 10 in the luminescent block 15A emit red light. The light-emitting diodes 10 in the luminescent block 15B emit orange light. The light-emitting diodes 10 in the luminescent block 15C emit white light.

Furthermore, with the circuits formed on the LED circuit board 12, the light-emitting diodes 10 in the luminescent block 15A emit light at different two levels of luminous intensity; and the light-emitting diodes 10 in the luminescent block 15B flash on and off.

The mounting density of the light-emitting diodes 10 in the luminescent block 15C, that is, the number of diodes disposed per unit length thereof, is greater than the mounting density of the light-emitting diodes 10 of each of the other luminescent blocks 15A and 15B.

Furthermore, retro-reflection-type reflectors 16 are disposed so that they are in front of the decorative member 13 and between the light guiding plates 7 that belong to the luminescent block 15C.

Each reflector 16, though its detailed structure is not shown, is formed by densely forming retro-reflection-type reflector elements on the back surface of a colorless transparent substrate.

With these reflectors 16, when the light from headlamps of the vehicles behind and the like is incident upon the reflectors 16, the light is reflected by the reflectors 16 to the light source, thus causing generally-termed "retro-reflection".

Under bright light such as daylight, the light-emitting diodes 10 of the vehicle marker lamp 1 are not turned on; and the front end surfaces (exit surfaces) 7 of the light guiding plates 7, the decorative member 13, and the reflectors 16 are visible through the front cover 3.

Among these visible components, the light guiding plates 7 have a great dimension in the front-back direction, that is, a great depth and appear with good depth characteristic to a viewer, thus giving a novel impression.

In addition, since the front end surfaces 7a of the light guiding plates 7 have densely-formed fine projections and depressions, the light-emitting diodes 10 are not visible through the light guiding plates 7. In order to prevent the light-emitting diodes 10 from being visible through the light guiding plates 7, fine projections and depressions can be formed on the rear end surfaces 7b of the light guiding plates 7.

When a braking operation is performed to stop the vehicle, the light-emitting diodes 10 in the luminescent block 15A are caused to emit light at the higher one of the two levels of luminous intensity, so that they function as a stop lamp.

In accordance with a steering operation for turning or in response to the operation for outputting a turn signal, the light-emitting diodes 10 in the luminescent block 15B flash on and off, so that they function as a turn signal lamp.

During a normal vehicle operation in a situation where there is not sufficient natural light, for example, in the night time or the like, the light-emitting diodes 10 in the luminescent block 15A emit light at the lower one of the two levels of luminous intensity, thus functioning as a tail lamp.

When a braking operation is performed, the light-emitting diodes 10 in the luminescent block 15A are caused to emit light at the higher one of the two levels of luminous intensity, thus functioning as a stop lamp.

When the preparation for backing up the vehicle is performed, a reverse shift gear is selected; and when this is done, the light-emitting diodes 10 in the luminescent block 15C are turned on.

Furthermore, in accordance with the steering operation for turning or in response to the operation for outputting a turn signal, the light-emitting diodes 10 in the luminescent block 15B flash on and off, thus functioning as a turn signal lamp.

In the above-described vehicle marker lamp, the light source is formed by the light guiding plate units 5 each of which includes the light guiding plate 7 disposed in parallel to the front-back direction of the lamp and the light-emitting diode group 6 arranged so as to face the rear end surface 7b of the light guiding plate 7. Accordingly, during the non-lighting state, the vehicle marker lamp produces a good depth appearance, and the light-emitting diodes 10 behind the light guiding plates 7 are substantially invisible. As a result, the color of the light guiding plates (transparent) 7 becomes dominant as a whole.

During the lighting state, the light-emitting diodes 10 produce light of functional colors, such as red, orange, etc. in accordance with the functions of the lamp. Accordingly, the lamp in the lighting state makes a great appearance difference from the non-lighting state and draws great attention of drivers of the following vehicles, contributing to the traffic safety.

As described in conjunction with the foregoing embodiment, a dense formation of fine projections and depressions on at least one of the front and rear end surfaces 7a and 7b of each light guiding plate 7 makes it more difficult for the light-emitting diodes 10 to be seen through the front cover 3.

Furthermore, when the light-emitting diodes 10 are turned on, the light-emitting portions 10a of the light-emitting diodes 10 are inconspicuous due to the fine projections and depressions formed on the light guiding plates 7, and the entire front end surface 7a of each light guiding plate 7 uniformly appears shining.

Furthermore, with the decorative member 13 disposed in the lamp chamber 4, it is possible to prevent the deep areas of the lamp chamber 4 and, particularly, the LED circuit board 12 and the light-emitting diodes 10 from being seen through the spaces between the light guiding plates 7.

In addition, in the above embodiment, the surface of each light guiding plate 7 on which the light from the light-emitting diodes 10 is incident is formed as step surface 8. Accordingly, the directions of light entering the light guiding plates 7 from the light-emitting diodes 10 can be controlled as desired. In some cases, light can be caused to exit from the side end surfaces of the light guiding plates 7, thus directing the light sideways of the marker lamp 1.

Also as described above, the light guiding plate units 5 are grouped into three luminescent blocks 15A, 15B and 15C; and the light-emitting diodes 10 in the luminescent blocks 15A, 15B and 15C have different luminescent colors. Thus, the luminescent blocks 15A, 15B and 15C emit light of colors different from one block to another when turned on though, when they are off, the lamp appears like a simple lamp that has a single function without any border in the lamp chamber 4. Thus, the lamp appears very differently when turned on and when turned off and gives a novel impression.

In the above embodiment, the light guiding plate units 5 that include the light guiding plates 7 with the front end surfaces 7a disposed horizontally are arranged in a vertical direction. However, the direction of arrangement of the light guiding plate units 5 is not particularly limited to such an arrangement. For instance, the light guiding plate units 5 with the front end surface 7a of each light guiding plate 7 disposed in a vertical direction may be arranged in a horizontal direction. Other manners of arrangement of the light guiding plate units 5 can be also adopted. In other words, various modifications are possible; and a diagonal arrangement, a mixed arrangement of a vertically arranged luminescent block and a horizontally arranged luminescent block, etc. can be taken.

The configurations and structures of various portions described with reference to the foregoing embodiment are mere illustrative examples of the embodiments of the present invention. The above description should not be interpreted as restrictions on the technical scope of the present invention.

As seen from the above, according to the present invention, the vehicle lamp comprises: a light-emitting diode group, which is formed by a plurality of light-emitting diodes disposed in a row so that an irradiation direction of the diodes is directed toward the front of the lamp, and a light guiding plate, which is a transparent plate and is provided in front of the light-emitting diode group so that the light guiding plate is disposed parallel to the front-back direction of the lamp; wherein a plurality of light guiding plate units are provided inside a lamp chamber, which is defined by a lamp body and a translucent front cover, that covers the front face of the lamp body, so that the light guiding plate units are disposed in the direction perpendicular to the front-back direction of the lamp, each of the light guiding plate units causing the light from the light-emitting diodes to enter the light guiding plate from the rear end surface of the light guiding plate and advance toward the front end portion of the light guiding plate and further causing at least substantially the entire light from the light-emitting diodes to exit from the front end surface of the light guiding plate toward the front of the lamp.

Since the light guiding plates are disposed in parallel to the front-back direction of the lamp body, the light-emitting diodes, which are the light sources, are positioned behind the light guiding plate. Thus, when the lamp is not turned on, the lamp produces a good-depth appearance, the light-emitting diodes are substantially invisible, and the color of the light guiding plates (transparent) appears dominant as a whole. In the lighted state, on the other hand, the light-emitting diodes emit light of functional colors, such as red, orange, etc. in accordance with the functions of the lamp. Accordingly, the lamp in the lighted state makes great appearance changes from the non-lighted state, and the lamp draws great attention of the drivers of the following vehicles, contributing to the traffic safety.

In the present invention, at least either one of the front end surface (exit surface) and the rear end surface (incidence surface) of the light guiding plate has fine projections and depressions that are densely formed entirely over such end surface. Accordingly, the light-emitting diodes disposed so as to face the rear end surface of the light guiding plate are almost not seen through the light guiding plate. Furthermore, when the light-emitting diodes emit light, the light-emitting portions of the light-emitting diodes are not conspicuous, and the entire front end surface of the light guiding plate appears shining uniformly.

Furthermore, in the present invention, a non-translucent platy member is disposed inside the lamp chamber so that it intersects with the intermediate portions of the light guiding plates. Accordingly, it is possible to prevent elements disposed in the deep portion of the lamp chamber, particularly, the light-emitting diodes, from being seen through the spaces between the light guiding plates.

In addition, the end surface of the light guiding plate that faces the light-emitting diodes, that is, the incidence surface of the light guiding plate, has a plurality of semi-circular recesses, thus making a step surface. Accordingly, the directions of light entering the light guiding plates from the light-emitting diodes can be controlled easily, and it is thus even possible to design so that the light exits from the side end surfaces of the light guiding plates illuminates the side of the lamp.

Furthermore, in the present invention, a plurality of luminescent blocks each comprising a plurality of light guiding plate units are provided, and the light-emitting diodes have different luminescent colors from one luminescent block to another. Accordingly, the luminescent blocks emit light in colors different from one block to another when turned on; and thus, when they are off, the lamp appears like a simple lamp that has a single function without any border in the lamp chamber. In other words, the lamp appears very differently when turned on and when turned off and thus gives a novel impression.

What is claimed is:

1. A vehicle lamp comprising:

a light-emitting diode group formed by a plurality of light-emitting diodes disposed in a row-aligned fashion so that an irradiation direction of said diodes is directed toward a front of a lamp, and a light guiding plate which is a transparent plate and is provided in front of the light-emitting diode group, said light guiding plate being disposed parallel to a front-back direction of the lamp; wherein a plurality of light guiding plate units are disposed, in a direction perpendicular to the front-back direction of the lamp, inside a lamp chamber defined by a lamp body and a translucent front cover that covers a front face of the lamp body, each of said light guiding plate units causing the light from the light-emitting diodes to enter the light guiding plate from a rear end surface of the light guiding plate and advance toward a front end portion of the light guiding plate and further causing at least substantially entire light from the light-emitting diodes to exit from a front end surface of the light guiding plate toward the front of the lamp.

2. The vehicle lamp according to claim 1, wherein at least one of the front end surface and the rear end surface of the light guiding plate is formed densely with fine projections and depressions for an entirety thereof.

3. The vehicle lamp according to claim 1, wherein a non-translucent platy member is disposed inside the lamp chamber in a direction that intersects with an intermediate portion of the light guiding plate.

4. The vehicle lamp according to claim 2, wherein a non-translucent platy member is disposed inside the lamp chamber in a direction that intersects with an intermediate portion of the light guiding plate.

5. The vehicle lamp according to claim 1, wherein a rear end surface of the light guiding plate that faces the light-emitting diode is formed as a step surface that comprises a plurality of semi-circular recesses.

6. The vehicle lamp according to claim 2, wherein a rear end surface of the light guiding plate that faces the light-emitting diode is formed as a step surface that comprises a plurality of semi-circular recesses.

7. The vehicle lamp according to claim 3, wherein a rear end surface of the light guiding plate that faces the light-emitting diode is formed as a step surface that comprises a plurality of semi-circular recesses.

8. The vehicle lamp according to claim 4, wherein a rear end surface of the light guiding plate that faces the light-emitting diode is formed as a step surface that comprises a plurality of semi-circular recesses.

9. The vehicle lamp according to claim 1, wherein:

a plurality of luminescent blocks each comprising a plurality of light guiding plate units are provided, and the light-emitting diodes of one of the luminescent blocks have different luminescent colors from the light-emitting diodes of another luminescent block.

10. The vehicle lamp according to claim 2, wherein:

a plurality of luminescent blocks each comprising a plurality of light guiding plate units are provided, and the light-emitting diodes of one of the luminescent blocks have different luminescent colors from the light-emitting diodes of another luminescent block.

11. The vehicle lamp according to claim 3, wherein:

a plurality of luminescent blocks each comprising a plurality of light guiding plate units are provided, and the light-emitting diodes of one of the luminescent blocks have different luminescent colors from the light-emitting diodes of another luminescent block.

12. The vehicle lamp according to claim 4, wherein:

a plurality of luminescent blocks each comprising a plurality of light guiding plate units are provided, and the light-emitting diodes of one of the luminescent blocks have different luminescent colors from the light-emitting diodes of another luminescent block.

13. The vehicle lamp according to claim 5, wherein:

a plurality of luminescent blocks each comprising a plurality of light guiding plate units are provided, and the light-emitting diodes of one of the luminescent blocks have different luminescent colors from the light-emitting diodes of another luminescent block.

14. The vehicle lamp according to claim 6, wherein:

a plurality of luminescent blocks each comprising a plurality of light guiding plate units are provided, and the light-emitting diodes of one of the luminescent blocks have different luminescent colors from the light-emitting diodes of another luminescent block.

15. The vehicle lamp according to claim 7, wherein:

a plurality of luminescent blocks each comprising a plurality of light guiding plate units are provided, and the light-emitting diodes of one of the luminescent blocks have different luminescent colors from the light-emitting diodes of another luminescent block.

16. The vehicle lamp according to claim 8, wherein:

a plurality of luminescent blocks each comprising a plurality of light guiding plate units are provided, and the light-emitting diodes of one of the luminescent blocks have different luminescent colors from the light-emitting diodes of another luminescent block.

\* \* \* \* \*